J. Miller, Jr.
Lock Nut.

No. 108,927.　　　　Patented Nov. 1, 1870.

Witnesses:　　　　　　　　　　Inventor:
John T. M. Stoops　　　　　　　John Miller, Jr.
A. K. Marr　　　　　　　　　　by Alexander & Mason
　　　　　　　　　　　　　　　Attys.

United States Patent Office.

JOHN MILLER, JR., OF MARSHALLTOWN, IOWA.

Letters Patent No. 108,927, dated November 1, 1870.

IMPROVEMENT IN LOCK-NUTS.

The Schedule referred to in these Letters Patent and making part of the same.

*To all whom it may concern:*

Be it known that I, JOHN MILLER, Jr., of Marshalltown, Marshall county, State of Iowa, have invented certain new and useful Improvements in "Nut-Locks;" and do hereby declare that the following is a full, clear, and exact description thereof, reference being had to the accompanying drawing and to the letters of reference marked thereon making a part of this specification, in which—

The nature of my invention consists in a novel manner of locking the nut upon the end of the bolt, as will be more fully hereinafter described.

A A in the annexed drawing represent the sections of a railroad-track, and

B B represent the fish-joints, both being of the usual construction.

Figure 1:
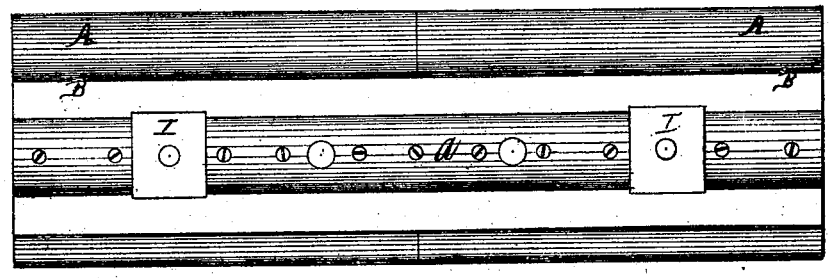
Figure 1 represents a side view of two sections of a railroad-track, showing the elongated metal strip attached to the fish-plate.
Figure 2:
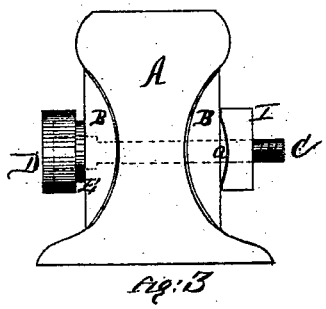
Figure 2 represents an end view, showing my nut-lock.
Figure 3:
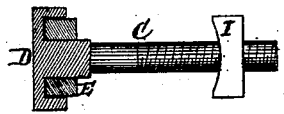
Figure 3 represents a section of the bolt.

Upon the exterior of the fish-joint B is secured an elongated metal bar, *a*, which is convex on its outer face, as shown in figs. 1 and 2.

C represents the bolt which passes through the fish-pieces B B and rails A, as well as through the bar *a*.

This bolt is made in the usual form excepting the head D, which is recessed on its inner side and incloses a rubber or other elastic spring, E.

I represents the nut which secures the bolt. This nut is grooved or made concave on its inner side so as to snugly fit the convexity of the metal bar *a*.

The operation of my invention is substantially as follows:

The rubber spring being in the head D, the bolt C is passed through the usual openings in the fish-pieces B B and the rails A, as well as the plate *a*.

The nut I is then screwed on the end of the bolt, tightly compressing the spring in the head and clasping itself against the convex plate *a*, making a substantial lock:

By my invention the nut cannot work itself loose from the bolt by jarring or otherwise.

I am aware that a nut-lock, composed of a bolt with a convex under surface of head, and convex nut with two concave spring fish-pieces countersunk around the holes where the bolt passes, for the head and nut to fit in, is not new, hence I disclaim such to be any part of my invention.

My nut-lock is applied to the usual form of fish-pieces in common use. I add or form with one of the fish-pieces an elongated rib. I use a bolt having a recessed head inclosing a spring. The nut I use has two concave grooves crossing each other at right angles, and which fit over the convex rib.

Having thus fully described my invention,

What I claim as new, and desire to secure by Letters Patent, is—

The combination of the recessed head D of the bolt C, spring E, elongated plate *a*, convex on its outer surface, and the nut I, concaved on its inner surface, all substantially as shown and described.

JOHN MILLER, JR.

Witnesses:
AMOS RUSSELL,
FRANK COX.